J. PRESTON & C. W. TENNIS.
PLOWS FOR LAYING OFF LAND FOR TOBACCO.

No. 179,728. Patented July 11, 1876.

UNITED STATES PATENT OFFICE.

JOHN PRESTON AND CHARLES W. TENNIS, OF MILLFORD, KENTUCKY.

IMPROVEMENT IN PLOWS FOR LAYING OFF LAND FOR TOBACCO.

Specification forming part of Letters Patent No. 179,728, dated July 11, 1876; application filed May 9, 1876.

*To all whom it may concern:*

Figure 1:
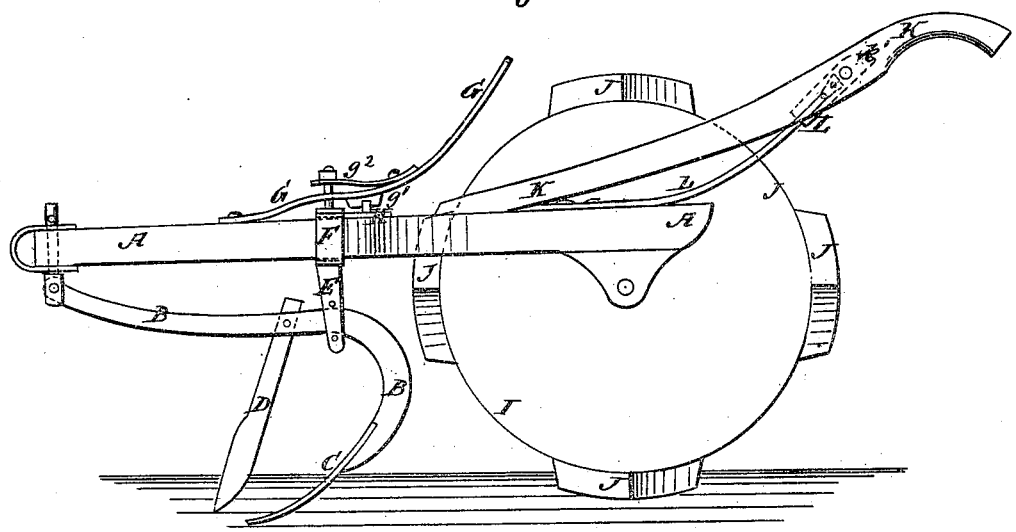
Figure 2:
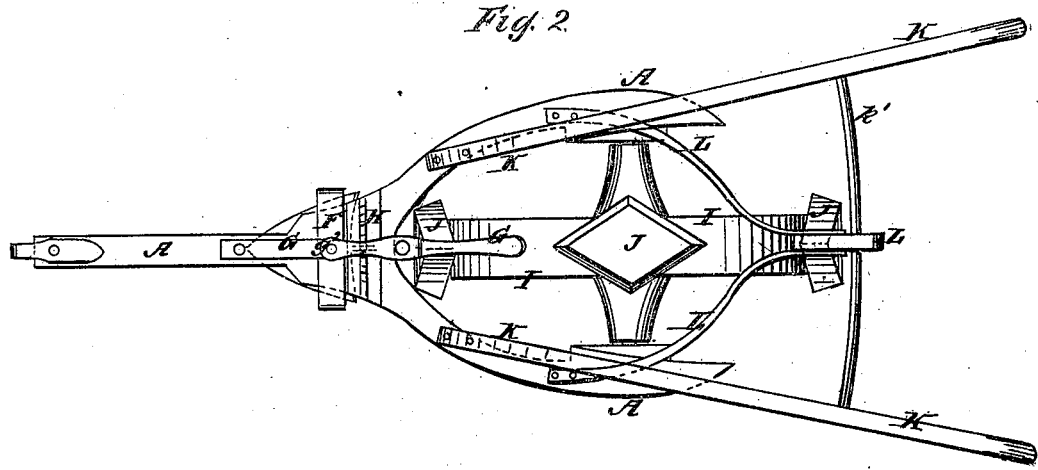

Be it known that we, JOHN PRESTON and CHARLES W. TENNIS, of Millford, in the county of Bracken and State of Kentucky, have invented a new and useful Improvement in Plow for Laying Off Land for Tobacco, &c., of which the following is a specification:

Figure 1 is a side view of our improved plow. Fig. 2 is a top view of the same.

Similar letters of reference indicate corresponding parts.

The object of this invention is to furnish an improved plow for laying off land and making the hills for tobacco, cabbages, and other plants cultivated by transplanting, which shall be so constructed as to open a furrow, roll the land, and mark the places for the hills, and which shall be simple in construction and convenient in use.

The invention consists in the wheel having diamond-shaped blocks attached to its face, in combination with the beam or frame and the plow, and in combination with the guide-arms, the sliding band, and the adjusting-lever, with the beam or frame and the plow, as hereinafter fully described.

A is the plow beam or frame, to the lower side of the forward end of which is pivoted the forward end of the beam B. The rear part of the beam B is curved downward, and to its end is attached a plow, C, for opening the furrow, and which is held down by a spring (not shown in the drawings) interposed between it and the beam or frame A. To the beam B is attached a cutter, D, for opening the soil and cutting off any roots that might impede the plow. The beam B passes between two guide-arms, E, which have several holes formed through them to receive a pin or bolt for limiting the depth to which the the plow C enters the ground. The upper ends of the guide-arms E are rigidly attached to or formed solid upon a band, F, that passes around the beam or frame A, and is made longer than the width of said beam, so that it may be adjusted transversely upon said beam. To the center of the sliding band F is pivoted a lever, G, the forward end of which is pivoted to the beam or frame A, and its rear end projects in to such a position that it may be conveniently reached and operated by the plowman. The lever G has a projection, $g^1$, formed upon its lower side, to enter one or another of the notches formed in the bar H, and is held down upon said bar by a spring, $g^2$, attached to said lever and to the upper end of its pivot. The rear part of the beam A is forked to receive the wheel I, and has bearings attached to the rear ends of its forks to receive the journals of the said wheels I. The rim of the wheel I is made wide, to adapt it to serve as a roller for rolling the land, and to its face, at a distance apart equal to the required distance apart of the plants, are attached diamond-shaped blocks J, which mark the places for the plants. K are the handles, the forward ends of which are attached to the forward parts of the forks of the beam A, and their rear ends are connected by a round, $k'$. The handles K are supported at the proper height by a standard, L, through the upper end of which passes the round $k'$.

The lower part of the standard L is forked, and the ends of the forks are attached to the rear part of the forks of the beam A.

As thus described, the machine is intended for use upon hilly, rough, or uneven land.

For use upon smooth level land we prefer to make the machine with two plows and two wheels or rollers.

In this case the wheels may be made hollow and water-tight, to contain water, and should be provided with stop-cocks passing out through the blocks J, projecting about three inches, and made with closed ends and perforated sides.

The stop-cocks are opened at the proper time by pins, against which their handles strike.

Having thus described our invention, we claim as new and desire to secure by Letters Patent—

1. The wheel I, having diamond-shaped blocks J attached to its face, in combination with the beam or frame A, and the plow B C, substantially as herein shown and described.

2. The combination of the guide-arms E, the sliding band F, and adjusting-lever G, with the beam or frame A, and the plow B C, substantially as herein shown and described.

JOHN PRESTON.
CHARLES W. TENNIS.

Witnesses:
THOMAS WIGGINS,
R. H. WARE.